(12) United States Patent
Yamagishi et al.

(10) Patent No.: US 6,474,170 B1
(45) Date of Patent: *Nov. 5, 2002

(54) PRESSURE SENSOR

(75) Inventors: Kouzou Yamagishi, Tokyo (JP);
Toshiaki Okumura, Tokyo (JP);
Kunihiro Yamaura, Tokyo (JP);
Takayuki Yokoyama, Tokyo (JP);
Kenji Kobayashi, Tokyo (JP)

(73) Assignee: Nagano Keiki Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/209,028

(22) Filed: Dec. 10, 1998

(30) Foreign Application Priority Data

Dec. 11, 1997 (JP) .............................................. 9-341227

(51) Int. Cl.7 ................................................ G01L 9/00
(52) U.S. Cl. ...................................................... 73/723
(58) Field of Search ........................... 73/715, 716–724, 73/726, 756; 361/283, 283.4

(56) References Cited

U.S. PATENT DOCUMENTS

| | | | | | |
|---|---|---|---|---|---|
| 4,128,006 | A | * | 12/1978 | Grabow ........................ | 73/724 |
| 5,325,720 | A | * | 7/1994 | Zuckerwar et al. ........... | 73/756 |
| 5,329,819 | A | * | 7/1994 | Park et al. ..................... | 73/724 |
| 5,656,780 | A | * | 8/1997 | Park ............................. | 73/724 |
| 5,792,958 | A | * | 8/1998 | Speldrich ...................... | 73/727 |
| 6,070,469 | A | * | 6/2000 | Taniguchi et al. ............ | 73/720 |
| 6,298,730 | B1 | * | 10/2001 | Yamagishi et al. ........... | 73/723 |

* cited by examiner

*Primary Examiner*—Harshad Patel
(74) *Attorney, Agent, or Firm*—Flynn, Thiel, Boutell & Tanis, P.C.

(57) ABSTRACT

A pipe having a through-hole of smaller diameter than a pressure port is disposed in the pressure port. Therefore, a volume of the pressure port can be reduced by the thickness of the pipe, thereby improving response of a pressure sensor. Furthermore, there is no need for the pressure port having smaller diameter to be provided by drill processing, so that a volume in the pressure port can be easily adjusted. Accordingly, the volume in the pressure port can be reduced with a simple structure to improve response of the pressure sensor.

20 Claims, 8 Drawing Sheets

F I G. 1
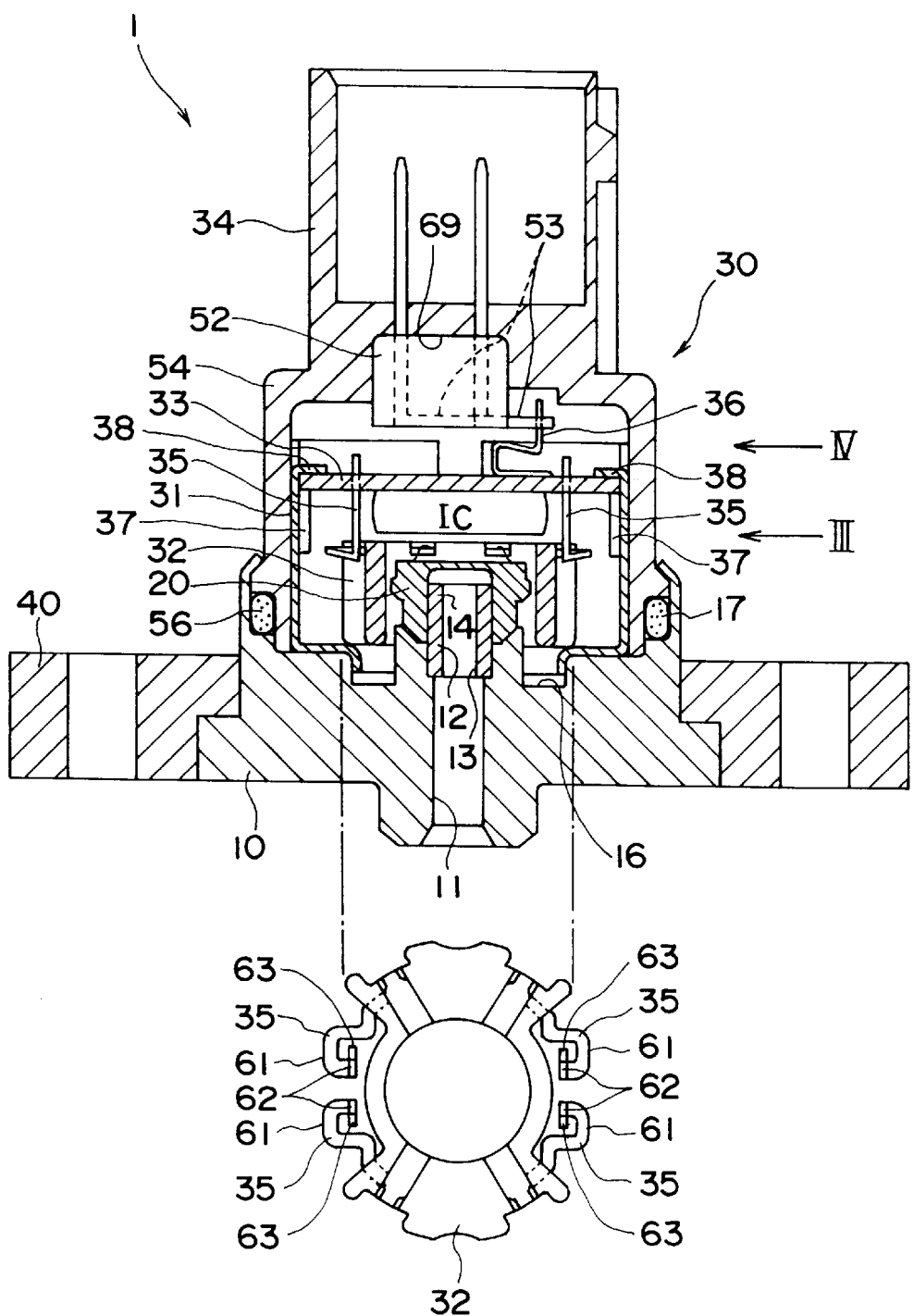

PRESSURE SENSOR

BACKGROUND OF THE INVENTION

1. Field of the Invention

The present invention relates to a pressure sensor. More specifically, it relates to a pressure sensor having a small volume of pressure port into which a pressure of a fluid is introduced to improve a response of the pressure sensor in detecting the pressure.

2. Description of Related Art

A pressure sensor which detects a pressure difference between a detecting pressure and atmospheric pressure and converts the detected pressure difference into an electric signal is used for measuring fluid pressure.

The pressure sensor has a fitting attached to a fluid channel, a pressure detecting module attached to the fitting by welding etc. and an output device electrically connected to the pressure detecting module. A fluid pressure introduced into a pressure port of the fitting is converted into a strain of a diaphragm which forms the pressure detecting module, the strain is detected by a strain gauge on the diaphragm and an electric signal in accordance with the resistance value of the strain gauge is output by the output device.

The pressure port in the fitting of the pressure sensor, for installing in an automobile for example, is approximately 20 mm length and approximately 2.5 mm in diameter (length:diameter=approximately 8:1) according to the smallest model, and the pressure port is processed by a twist drill.

The pressure port of the pressure sensor is preferably small in diameter to reduce inner volume thereof so that a response of the pressure detecting module is improved. However, it has been difficult to further lessen the diameter of the pressure port and to reduce inner volume according to the conventional twist drill processing.

SUMMARY OF THE INVENTION

The object of the present invention is to provide a pressure sensor having small volume of a pressure port with a simple structure to enhance response thereof.

A pressure sensor according to the present invention has a fitting provided with a pressure port for introducing the fluid pressure and a pressure detecting module attached to the fitting and shutting an end of the pressure port. The pressure sensor is characterized in that a volume adjusting member having a penetrating channel of a smaller cross section than the pressure port is disposed inside the pressure port of the fitting.

As the volume adjusting member, a cylindrical member can be used for example. However, the volume adjusting member may be prism-shaped or shaped in other kind of block to be accommodated inside the pressure port to occupy inside the pressure port at a volume corresponding thereto.

The penetrating channel may be a through-hole formed along a central axis of the cylindrical volume adjusting member. In this case, the through-hole naturally has smaller diameter than the pressure port.

On the other hand, the penetrating channel may be a groove cut into a side of the cylindrical volume adjusting member to reach both ends of the volume adjusting member. The groove may be formed in plural on a surface of the volume adjusting member, or may be cut on one part of the volume adjusting member to reach a central axis position (the cross section of the volume adjusting member is approximately C-shaped or U-shaped).

Alternatively, if the pressure port is a cylindrical space, inserting a prism-shaped volume adjusting member allows a predetermined aperture therearound. The aperture is naturally narrower than the pressure port, which can be used for introducing pressure.

According to the present invention, the volume adjusting member is preferably accommodated inside the pressure port so that the pressure is transmitted to the pressure sensor through the penetrating channel and the volume inside the pressure port is decreased by the volume of the volume adjusting member, thereby improving the response of the pressure sensor. Furthermore, a small diameter of the pressure port, which is difficult to be processed, is not necessary to be provided to the fitting by a twist drill, thereby facilitating manufacturing.

The pressure detecting module is preferably abutted and welded to the fitting, and the volume adjusting member is preferably disposed to a position corresponding to a welded part of the fitting and the pressure detecting module.

The position corresponding to the welded part refers to a position where the volume adjusting member covers the welded part from a back side thereof or the volume adjusting member extends over the welded part.

Accordingly, the fitting and the pressure detecting module can be securely mounted by welding and an over-penetration in welding can be prevented since the volume adjusting member is disposed to the position corresponding to the welded part of the fitting and the pressure detecting module so that the volume adjusting member works as a backing member in welding.

In conducting the welding, the abutting portion of the fitting and the pressure detecting module preferably has a tapered surface (a surface approximately conic) where the pressure detecting module is projected to grow narrower in proportion to a distance from the center of the pressure port, and the welding is preferably conducted from a direction of a slanting angle of the tapered surface.

Accordingly, since the abutting portion of the fitting and the pressure detecting module is tapered and the welding is conducted from the slanting angle direction of the tapered surface, welded area can be enlarged to further improve the bonding strength of the pressure detecting module, thereby allowing uses in a higher pressure range.

In welding (irrespective of being tapered or not), the welding direction is usually a central axis direction of the fitting and the pressure detecting module (radial direction).

On the other hand, the direction in which welding is conducted in the present invention is preferably offset in a predetermined direction relative to a central axis of the fitting and the pressure detecting module so that a trace of the welded part forms an envelope ranging sequentially with each other. More specifically, by arranging the weld trace for each part to align in a tangential direction along the side of the volume adjusting member, such envelope can be formed.

Accordingly, the welded area can be further increased, and over-penetration possibility can be decreased since the weld length of each part is made longer. Furthermore, irregularities caused inside can be made smaller as compared to welding in a radial direction.

The pressure detecting module of the present invention may have a cylindrical portion on a side connected to the fitting, and the volume adjusting member may be disposed to an end of the pressure port to which the pressure detecting module is attached with a part thereof being protruded, the outer side of the protruded part being a guiding surface contacted to the inner side of the cylindrical portion of the pressure detecting module.

Accordingly, since the pressure detecting module is guided by the outer surface of the volume adjusting member, the pressure detecting module can be easily disposed.

In the above, the volume adjusting member is preferably a cylindrical pipe obtained by drawing processing.

The response of pressure sensors is also largely influenced by a dimension accuracy of the through-hole. Accordingly, by producing the volume adjusting member with drawing processing, the dimension accuracy of the through-hole can be improved, thereby obtaining a pressure sensor stable in quality.

BRIEF DESCRIPTION OF THE DRAWINGS

FIG. 1 is a cross sectional view showing a pressure sensor according to a preferred embodiment of the present invention;

DETAILED DESCRIPTION OF THE PREFERRED EMBODIMENT(S)

Figure 2:
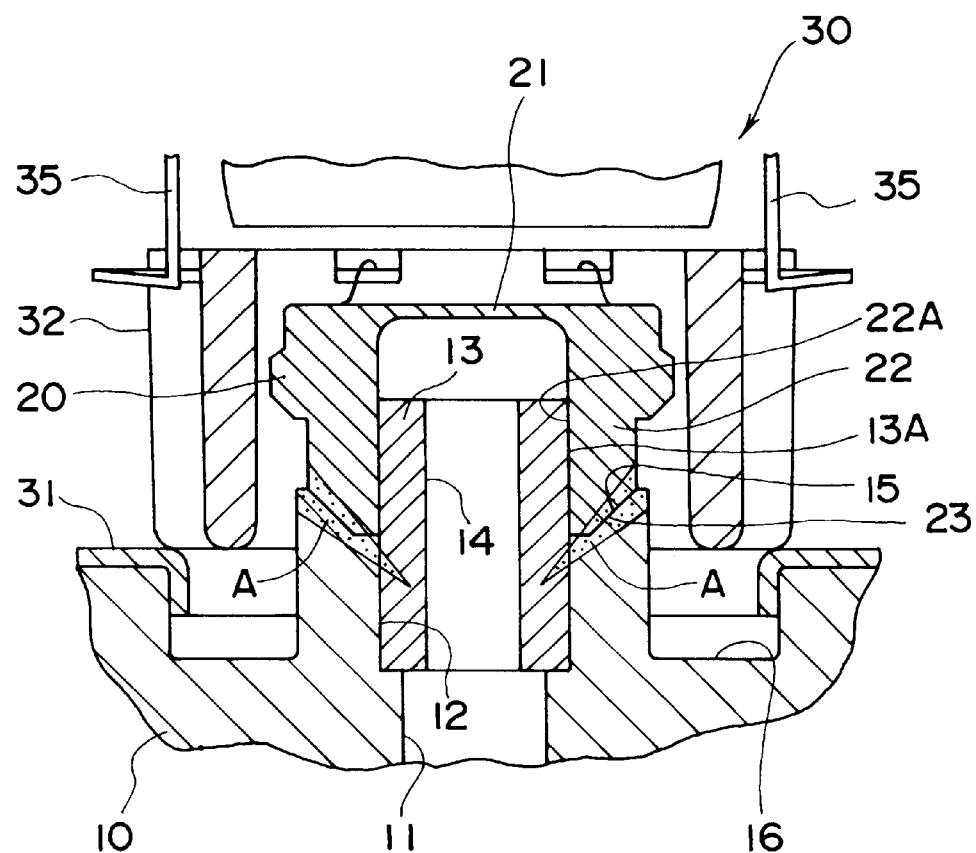
FIG. 2 is an enlarged view showing principal part of the aforesaid embodiment.

A preferred embodiment according to the present invention will be described below with reference to drawings.

FIG. 1 shows a pressure sensor 1 according to the present embodiment.

The pressure sensor 1 has a fitting 10 fitted to an opening of a channel (not shown), a pressure detecting module 20 beam-welded to the fitting 10 and an output device 30 for outputting an electric signal in accordance with a detected pressure to the outside, and is installed on an automobile for detecting, specifically, hydraulic pressure of a brake. Incidentally, the fitting 10 according to the present embodiment is fixed to the channel with a bolt at a flange 40. However, the flange 40 may be provided integrally with the fitting 10.

The fitting 10 is made of metal and has at a center thereof a pressure port 11 penetrating in top and bottom direction in the figure (the wordings of "top" and "bottom", "up" and "down" and the like hereinafter only refer to a position in respective figures, which do not mean a position actually installed).

The pressure port 11 has a diameter of approximately 2.5 mm, which is easily processed by a twist drill. The upper end of the pressure port 11 is a fitted portion 12 which is drilled to be a large diameter. A pipe 13 is fitted to the fitted portion 12 with a portion thereof being protruded from the pressure port 11.

The pipe 13 as a volume adjusting member is a metal cylindrical member obtained by a drawing processing, of which length is 5 to 20 mm considering processing automation. The pipe 13 has a penetrating hole 14 along the axis thereof. The diameter of the penetrating hole 14 is sufficiently smaller than the pressure port 11, which is difficult to be drilled.

The pipe 13 and the fitted portion 12 are fitted by a "running fit". That is, the inner diameter of the fitted portion 12 and the pressure detecting module 20 and the outer diameter of the pipe 13 are respectively defined so that a gap of approximately 0.01 mm to 0.1 mm is secured therebetween, and the gap prevents unnecessary stress from generating by fitting mutually.

As shown in FIG. 2, a tapered surface 15 is provided on an upper outer 30 periphery of the pressure port 11, the tapered surface 15 inclined in lower direction (front of the fitting direction of the pressure detecting module 20) as the tapered surface 15 get close to the center of the pressure port 11. The angle of the tapered surface 15 is slanted relatively to the radial direction of the pressure port 11 at a degree of 30° to 60°, preferably 35° to 55°, more preferably, 40° to 50°. A locating groove 16 is provided further outside the tapered surface 15, which is used in attaching the case 31 described below.

The pressure detecting module 20 is a module of a strain gauge, where a strain gauge is provided on an upper side of the metal diaphragm 21 (FIG. 2) through an insulating layer such as silicon oxide. The diaphragm 21 of the pressure detecting module 20 is integrally formed with the cylindrical portion 22 provided thereunder, and the pressure detecting module 20 as a whole is guided by an outer side 13A as a guiding surface to be disposed above the fitting 10 with an inner side 22A of the cylindrical portion 22 being abutted to an outer side 13A of the pipe 13. Accordingly, the inside of the cylindrical portion 22 is in communication with the pressure port 11 to allow hydraulic pressure to be applied on a pressure sensing surface of the diaphragm 21.

Another tapered surface 23 opposing and abutting to the tapered surface 15 of the fitting 10 is provided on a lower end of the cylindrical portion 22 and the tapered surfaces 15 and 23 are beam-welded from a direction along the slanting angle thereof with respective tapered surfaces being abutted. The beam-welding is conducted so that a melted portion A reaches the pipe 13. Since the pipe 13 is disposed to a position corresponding to the welded part, the pipe 13 is also used as a backing member.

Incidentally, when the slanting angle of the tapered surfaces 15 and 23 is less than the aforesaid lower limit (30°), welding strength can not expected to be improved since welded area is not so large. Furthermore, the welding itself may be impossible since a welding machine is interfered by a rising portion 17 provided on a periphery of the fitting 10. On the contrary, when the slanting angle is larger than the upper limit (60°), the welding machine and a bulging portion provided on an upper side of the cylindrical portion 22 interfere with each other, and adjustment of the welding machine and the jig becomes difficult, thereby deteriorating productivity.

Figure 5:
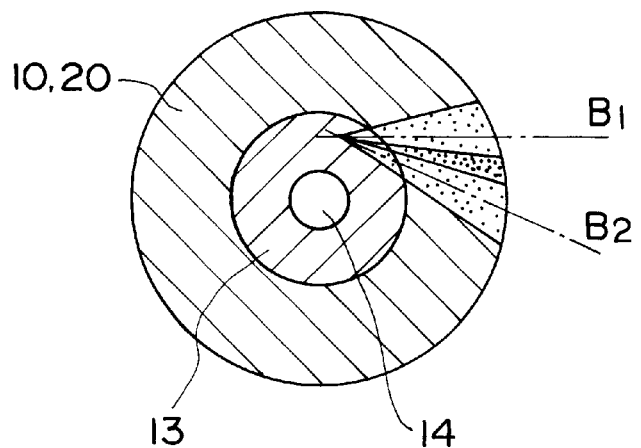
FIG. 5 is a cross sectional view enlarging and showing an offset welding of the aforesaid embodiment.

As shown in FIG. 5, a welding direction is offset from a central axis of the fitting 10 and the pressure detecting module 20 to a predetermined direction so that welded trace of respective portions forms an envelope ranging sequentially with each other. More specifically, the welding beam is disposed to align on a side of the pipe 13 along a tangential direction in respective portion of the welded circumference, thereby creating the envelope.

Figure 6:
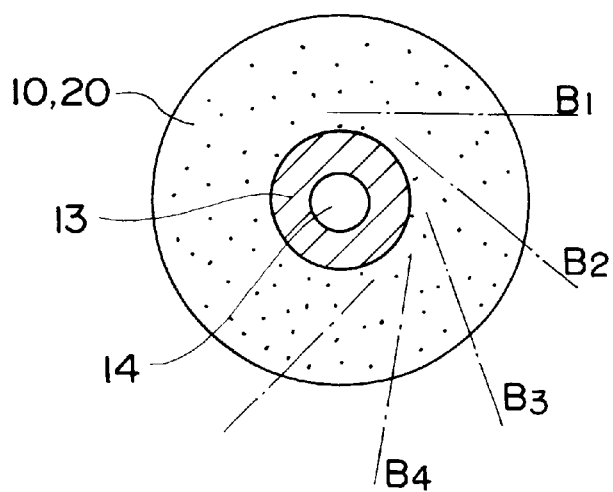
FIG. 6 is a cross sectional view enlarging and showing a condition after the offset welding of the aforesaid embodiment.

Accordingly, the welded area can be increased as shown in FIG. 6, welded length of respective portion can be extended to reduce the possibility of weld over-penetration, and irregularities generated inside can be made small as compared to welding in radial direction.

Figure 7:
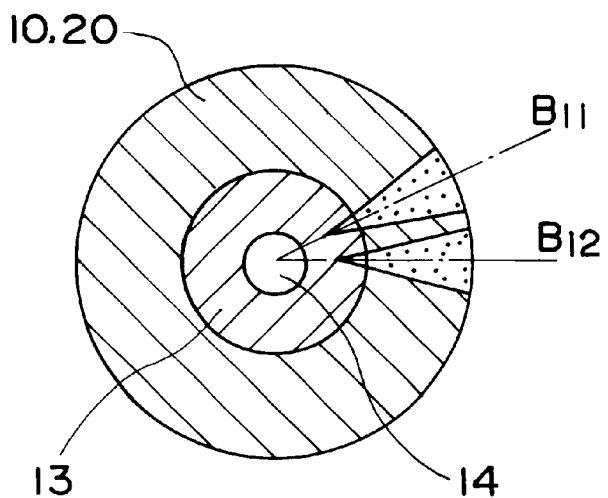
FIG. 7 is a cross sectional view corresponding to FIG. 5 showing welding in radial direction.
Figure 8:
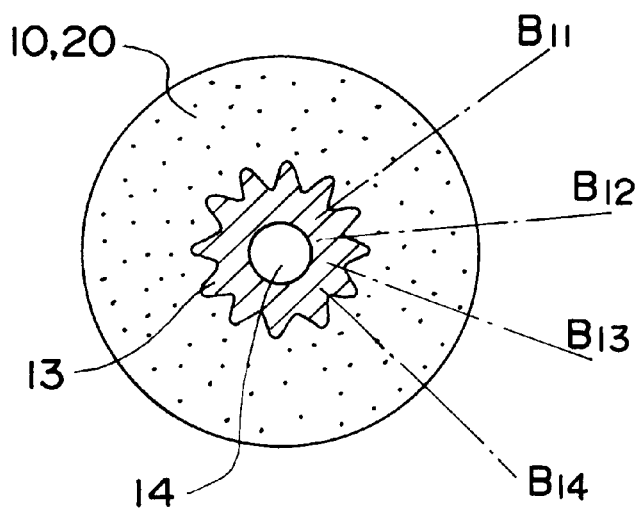
FIG. 8 is a cross sectional view corresponding to FIG. 6 showing a condition after welding in radial direction.

However, the welding direction can be radial toward central axis of the fitting 10 and the pressure detecting module 20 as shown in FIG. 7. In this case, though the irregularities can be generated inside the welded part as shown in FIG. 8, sufficient performance can be ensured.

The output device 30 has a metal case 31 for screening electromagnetism positioned by engaging to the positioning groove 16 of the fitting 10, a resin base member 32 surrounding the pressure detecting module 20 disposed at an bottom portion of the case 31, a circuit substrate 33 provided above the base member 32 and a connector 34 covering the entire members of 31, 32 and 33. The case 31 is projection-welded to the fitting 10. The base member 32 and the circuit substrate 33 is connected by first terminal 35, and the circuit substrate 33 and the connector 34 is connected by second terminal 36.

Figure 3:
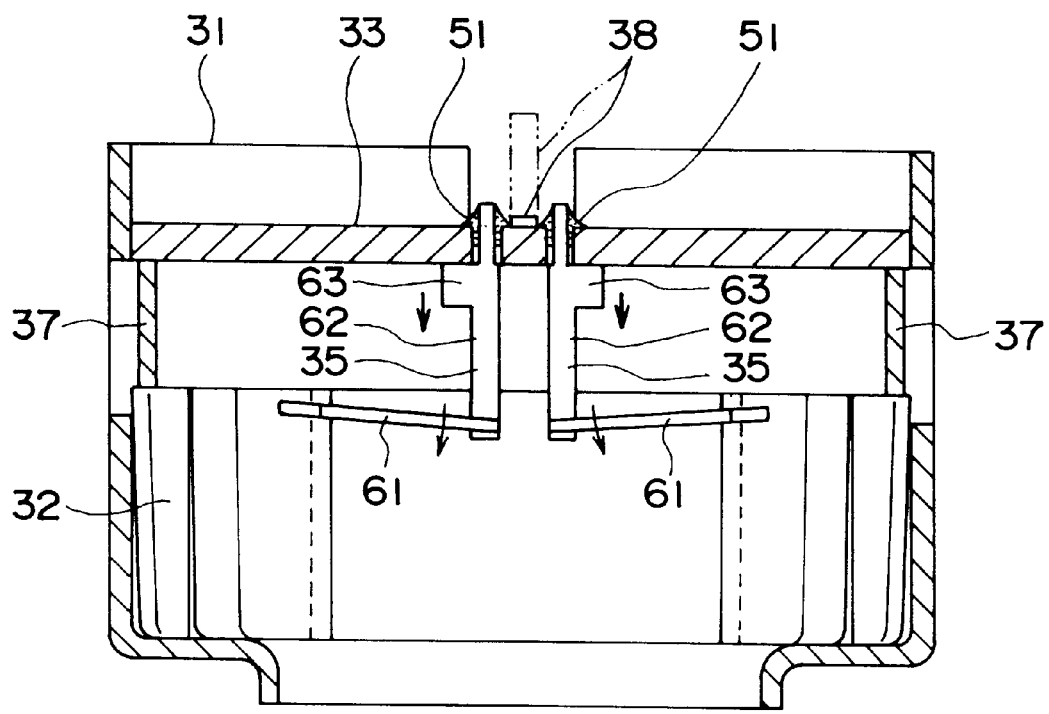
FIG. 3 is a side elevational view showing components of the aforesaid embodiment, which is seen from an arrow III of FIG. 1.

As shown in FIGS. 1 and 3, the case 31 has a supporting portion 37 on a side portion thereof, the supporting portion processed by press or cut-and-raise (forming a cut and bending the cut portion). The circuit substrate 33 is mounted on the supporting portion 37. A contact portion 38 bending over the circuit substrate 33 is provided on a part of upper periphery of the case 31. The contact portion 38 electrically connects the case 31 (the flange 40 in the end) and a ground wire provided on the circuit substrate 33 and hold the circuit substrate 33 from upward direction.

A lower end of the first terminal 35 is insert-molded to the base member 32. The lower end of the first terminal 35 has an exposed portion, and the exposed portion and the strain gauge of the pressure detecting module 20 is electrically connected by wire bonding and the like.

Figure 4:
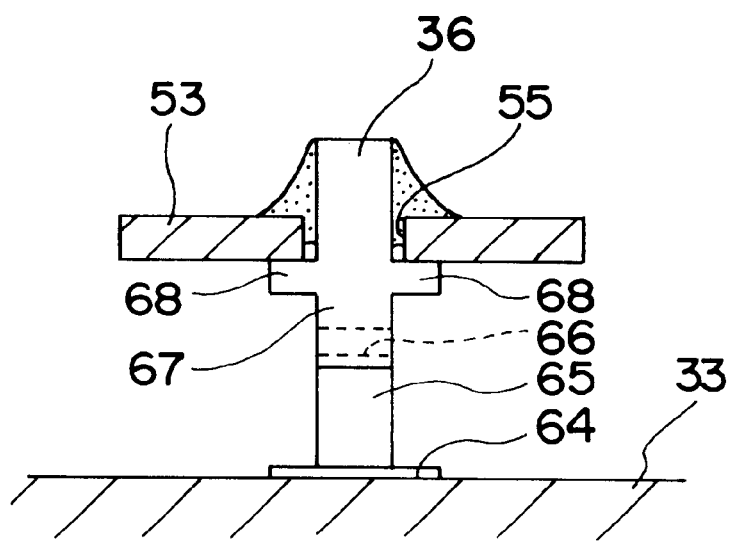
FIG. 4 is another side elevational view showing other components of the aforesaid embodiment, which is seen from an arrow IV of FIG. 1.

The circuit substrate 33 has thereon an electric circuit assembly of IC, resistor, capacitor and the like which forms an electric circuit. As shown in FIG. 3, a through-hole 51 is provided to an input side of the electric circuit, the through-hole 51 having an upper end of the first terminal 35 being inserted and soldered therethrough. A lower end of plurality of the second terminal 36 (only one of them is shown in FIGS. 1 and 4) is soldered to an output side of the electric circuit.

The connector 34 has a plurality of terminal 53 insert-molded to a resin-made receiving member 52. As shown in FIG. 4, an upper end of the second terminal 36 is inserted and soldered to an inserting hole 55 provided to lower side of the terminals 53. The respective terminal 53 as well as the receiving member 52 are fixed from the inside of a connector body 54 so that a tip end thereof being exposed. The lower side of the connector body 54 is positioned inside the rising portion 17 of the fitting 10 through an O-ring 56. Accordingly, the connector body 54 is fixed to the fitting 10 by crimping a tip end of the rising portion 17.

In the output device 30, the pressure applied to the diaphragm 21 of the pressure detecting module 20 is converted into an electric resistance value by the strain gauge on the diaphragm 21 and the electric circuit of the circuit substrate 33 connected to the strain gauge through the first terminal 35. The resistance value is converted into a predetermined electric signal by the electric signal, which is output from the terminal 53 of the connector 34 through the second terminal 36.

FIG. 3 shows an enlarged view of the first terminal 35. Incidentally, the IC and the like are not shown in FIG. 3.

The first terminal 35 has a horizontal portion 61 protruded from a side of the base member 32 and a vertical portion 62 extending in a vertical direction from a tip end of the horizontal portion 61. The horizontal portion 61 works as a plate spring supported with one end being fixed so that the first terminal 35 can be elastically deformed between the base member 32 and the circuit substrate 33. The vertical portion 62 has a collar portion 63 abutting to a lower side of the circuit substrate 33 at a position adjacent to a tip end and slightly retreated to an attached side (the horizontal portion 61 side)

Before the circuit substrate 33 is disposed to the first terminal 35 (the state not shown), an upper end of the collar portion 63 is positioned above the upper end of the supporting portion 37 of the case 31. Accordingly, when the circuit substrate 33 is mounted on the supporting portion 37, the collar portion 63 is pushed downward by the lower side of the circuit substrate 33 so that the first terminal 35 is elastically deformed (see arrows in FIG. 3). The first terminal 35 is soldered to the through-hole 51 in this state.

FIG. 4 shows an enlarged view of the second terminal 36.

The second terminal 36 has a contact portion 64 soldered to the circuit substrate 33, first vertical portion 65 extending upward from an end of the contact portion 64, a horizontal portion 66 extending from an end of the first vertical portion 65 and second vertical portion 67 extending further upward from the horizontal portion 66. Accordingly, the second terminal 36 is formed in a crank-shape (see FIG. 1), which can be elastically deformed by the horizontal portion 66 as a plate spring. A pair of collar portion 68 abutting to lower side of the terminal 53 are provided to the second vertical portion 67 at a position adjacent to a tip end and slightly retreated to an attached base (the horizontal portion 66 side).

The terminal 53 is soldered being abutted to the collar portion 68, the terminal 53 as well as the receiving member 52 are inserted to an inserting portion 69 of the connector body 54 as shown in FIG. 1, and the connector body 54 is fixed to the fitting 10 so that the second terminal 36 is elastically deformed. In other words, the second terminal 36 is elastically deformed only after the entire connector 34 is attached to the fitting 10.

According to the present embodiment, the pressure detecting module 20 is beam-welded to the fitting 10. Next, the case 31 is disposed to the fitting 10 to projection-weld, the base member 32 is disposed thereon and bonded and welded thereafter, and the pressure detecting module 20 and the first terminal 35 are electrically connected by wire bonding.

The circuit substrate 33 is mounted from upward direction to insert the first terminal 35 to the through-hole 51 and the circuit substrate 33 is fixed by bending the contact portion 38 of the case 31 so that the first terminal 35 is soldered while being elastically deformed.

Next, the terminal 53 integrated with the receiving member 52 is soldered to the second terminal 36 and the receiving member 52 is inserted to the inserting portion 69 of the connector body 54 to fix by an adhesive or a latch method. The connector body 54 is fixed to the fitting 10 to elastically deform the second terminal 36. Lastly, the fitting 10 is crimped to fix the connector 34, thereby completing assembling the pressure sensor 1.

In attaching the pressure sensor 1 to the automobile and the like, the pressure sensor can be bolted with the flange 40.

According to the above-described embodiment, following effect can be obtained.

Since the pipe 13 having the penetrating hole 14 of which diameter is smaller than the diameter of the pressure port 11 is provided in the pressure port 11, the volume inside the pressure port 11 can be reduced by a thickness of the pipe 13, thereby improving a response of the pressure sensor 1.

Since the diameter of the penetrating hole 14 is smaller than the diameter of the pressure port 11, which is not processed by a twist drill but is processed simultaneously with the drawing processing of the pipe 13, the processing of the penetrating hole 14 is easy and the volume control inside the pressure port 11 can be facilitated.

Since the fitting 10 and the pressure detecting module 20 is welded, a bonding strength therebetween can be made larger. Furthermore, since the melted portion of the welding reaches the pipe 13, the pipe 13 can be welded simultaneously with the welding of the fitting 10 and the pressure detecting module 20, thereby fixing the pipe 13 strongly and efficiently.

Since the pipe 13 is located to a position corresponding to the welded part of the fitting 10 and the pressure detecting module 20, the pipe 13 also works as a backing member so that the over-penetration in welding can be securely prevented.

Since the abutting portion of the fitting 10 and the pressure detecting module 20 is the tapered surfaces 15 and 23 respectively, and the fitting 10 and the pressure detecting module 20 are welded in the slanting angle direction of the tapered surfaces 15 and 23, the welded are can be made larger to strengthen the bonding of the pressure detecting module 20, thereby allowing the pressure sensor 1 to be used in higher pressure range.

Since the welding beam is arranged to align in the tangential direction along the pipe 13 in respective part of weld circumference to form an envelope, the welded area can be further increased and the over-penetration possibility can be reduced on account for lengthening the welded dimension. Furthermore, the irregularities caused inside can be made smaller than welding in radial direction.

Since the pipe 13 is disposed to protrude from an end of the pressure port 11 and the outer side 13A of the protruded part is the guiding surface of the pressure detecting module 20, the attachment of the pressure detecting module 20 can be facilitated by guiding the inner side 22A of the cylindrical portion 22 of the pressure detecting module 20 with the outer side 13A of the pipe 13.

The response of the pressure sensor 1 can be largely influenced by dimension accuracy of the through-hole. Since the pipe 13 is processed by drawing processing, highly-accurate penetrating hole 14 can be obtained so that the quality of the pressure sensor 1 can be further stabilized.

Since the first and second terminal 35 and 36 can be elastically deformed between the base member 32 and circuit substrate 33, and circuit substrate 32 and the terminal 53 respectively, and since the collar portions 63 and 68 which are pushed down by the lower side of the circuit substrate 33 or the terminal 53 are provided to the first and the second terminal 35, 36, the terminals 35 and 36 can be elastically deformed at a predetermined amount in assembling the pressure sensor 1. Accordingly, an opposing force is caused to each terminal 35, 36 by the circuit substrate 33 and the terminal 53 irrespective of ambient temperature to cancel a stress caused on soldered portion by a thermal expansion of the terminals 35 and 36, thereby preventing substantial stress from causing on the soldered area. Therefore, a deterioration of the soldered area can be effectively prevented when the pressure sensor 1 is disposed to a high temperature area such as a position adjacent to an automobile engine.

In the above, since the first and second terminal 35, 36 are further elastically deformed by thermal expansion, a stress caused to an abutting portion of the collar portion 63 of the first terminal 35 and a part of the circuit substrate 33 adjacent to the through-hole 51, and an abutting portion of the collar portion 68 of the second terminal 36 and a part of the terminal 53 adjacent to the inserting hole 55 can be decreased.

Since the first and the second terminal 35, 36 works as a plate spring with an end thereof being supported while the other end being fixed or being bent in a crank-shape, a sufficient elastic force can be applied to respective terminals 35 and 36.

Since the fitting 10 has the locating groove 16, a location of the case 31 can be determined only by engaging a protrusion projecting from a bottom face of the case 31. Accordingly, the locating can be easily done.

The existence of the locating groove 16 allows the stress caused on the fitting 10 to be reduced. Especially, a stress applied to the pressure detecting module 20 can be diminished to decrease an output fluctuation, thereby improving reliability.

The present invention is not limited to the above-described embodiment, but includes other structures as long as the object of the present invention can be attained and a modification and the like described below is also included within the scope of the present invention.

Figure 9:
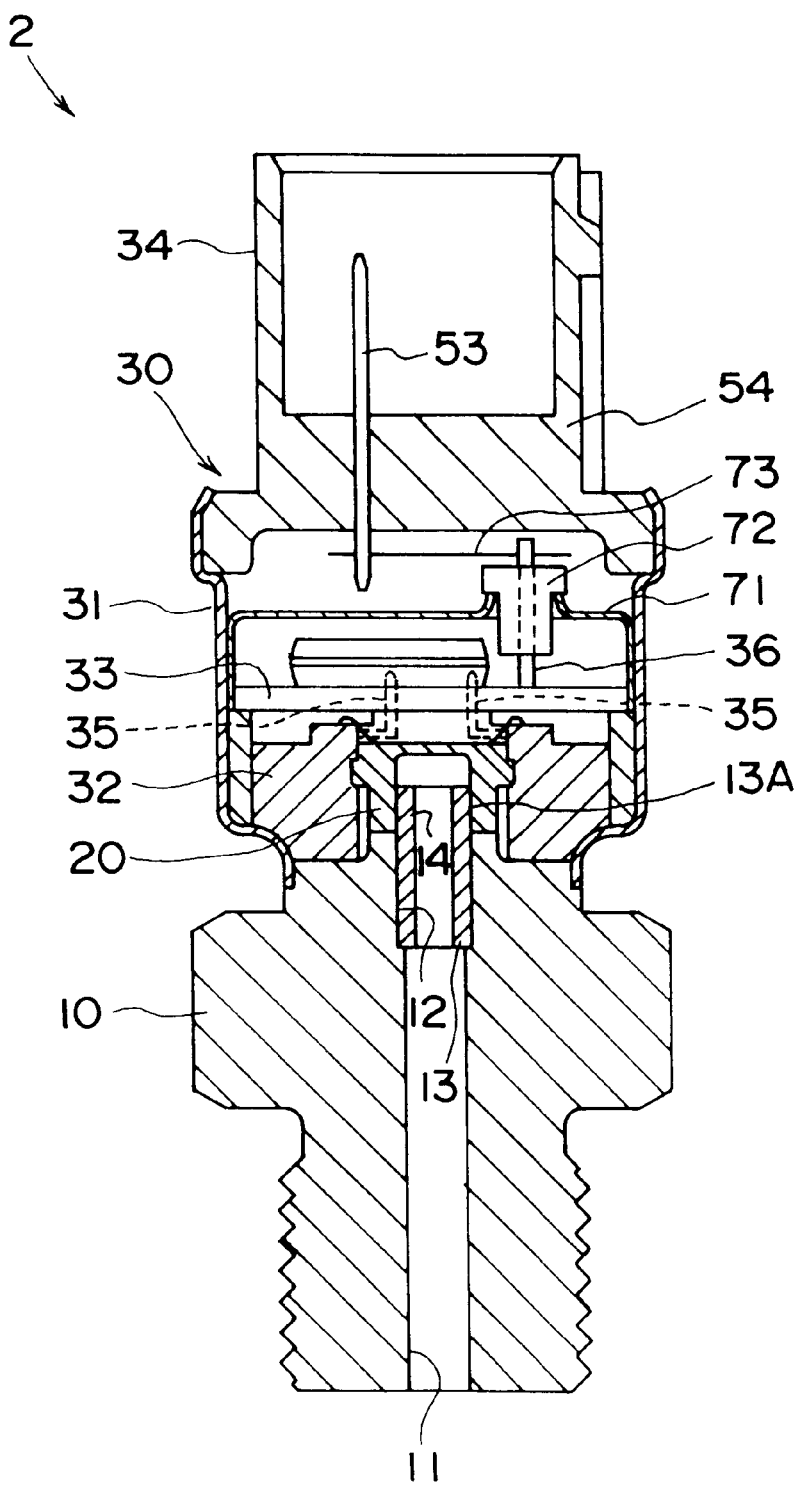
FIG. 9 is a cross sectional view showing a modification of the present invention.

The pressure sensor according to the present invention may be structured as shown in FIG. 9.

Figure 10:
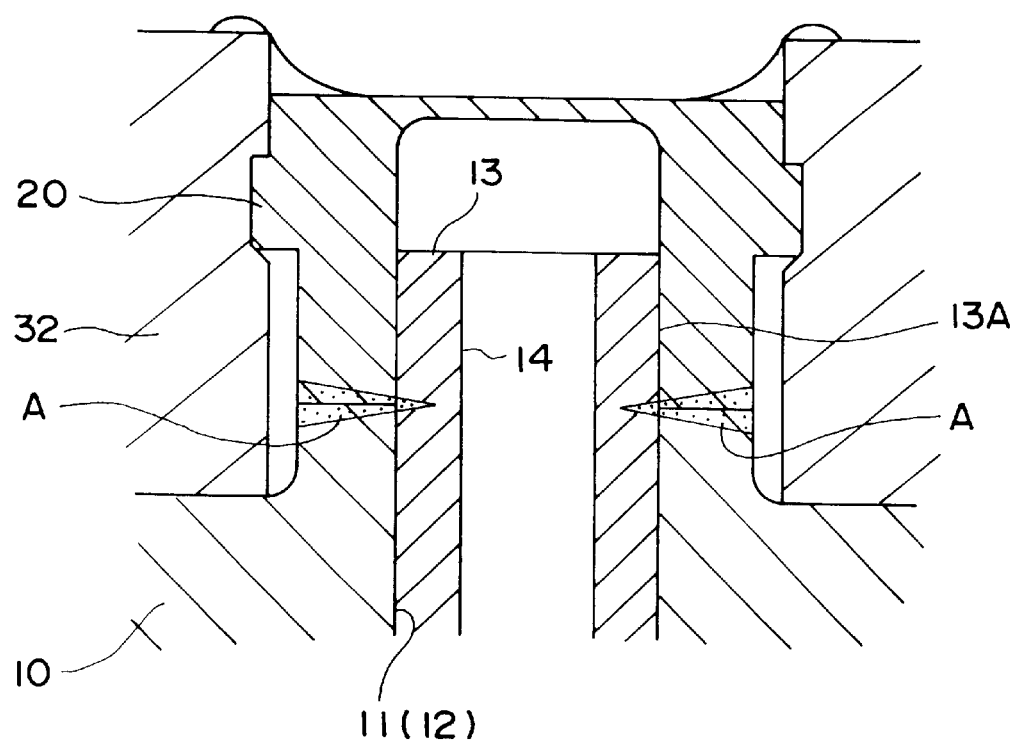
FIG. 10 is an enlarged view of the aforesaid modification.

The pressure sensor 2 shown in FIG. 9 is largely different from the above-described pressure sensor 1 in that the fitting 10 is directly screwed to an opening of a fluid channel without employing the flange 40, there is not rising portion 17 on the fitting 10, the fitting 10 and the pressure detecting module 20 can be beam-welded in a radial direction of the pressure port 11 (90° direction relative to axis direction) as shown in FIG. 10, the case 31 is disposed between the connector 34 and the fitting 10 with the case 31 being exposed outside, and the circuit substrate 33 is sheltered also by a metal lid member 71. Additionally, the pressure sensor 2 is different from the pressure sensor 1 in employing a feedthrough capacitor 72 and flexible substrate 73 as the output device 30 and in configuration of the connector 34. Other structure is approximately the same as the pressure sensor 1.

Since the pipe 13 is provided in the pressure port 11 in the pressure sensor 2 as in the aforementioned embodiment, the aforesaid effects obtained by employing the pipe 13 can also be obtained. However, since the fitting 10 and the pressure detecting module 20 are welded from the radial direction of the pressure port 11, there is a limit for enlarging the welded area between the fitting 10 and the pressure detecting module 20.

In the pressure sensor 1 of the aforementioned embodiment and the pressure sensor 2 shown in FIG. 9, the pipe 13 is fitted to the fitted portion 12 of the pressure port 11. However, the diameter of the pressure port 11 and the outer diameter of the pipe 13 may be made approximately the same to dispose the pipe 13 without providing inserting portion. In this case, the pipe 13 may extend at an entire length in a longitudinal direction of the pressure port 11.

According to the present invention, the pipe 13 is not required to be protruded from the pressure port 11, but the pipe 13 may be disposed on a same surface of the upper end of the pressure port 11 or totally seated inside the pressure port 11. However, in this case, the pipe 13 cannot be used as a backing member for welding the fitting 10 and the pressure detecting module 20. Further, the pipe 13 cannot be fixed with the use of the melt by the welding, the pipe 13 has to be press-fitted or the like to the pressure port 11. Further, the pipe 13 cannot be used as a guiding member for attaching the pressure detecting module 20. Therefore, the pipe 13 is preferably located to a corresponding position to the welded position of the fitting 10 and the pressure detecting module 20, and is preferably protruded over the pressure port 11.

According to the aforementioned embodiment, the pipe 13 is formed by drawing processing. However, the pipe 13 may be formed by any practicable processing method and is not restricted to drawing processing.

The penetrating channel for introducing pressure is not restricted to a through-hole along the central axis, but may be a groove provided on the peripheral portion of the pressure port.

In the aforementioned embodiment, the pressure sensor is for installing an automobile and specifically for detecting hydraulic pressure of a brake. However, the pressure sensor according to the present invention is not limited to the specific uses, but can be installed on a vessel, construction machine, freezing machine and any other machines, and can be applied for detecting air-pressure, water pressure and pressure of any fluid.

What is claimed is:

1. A pressure sensor for detecting a fluid pressure, comprising:
    a fitting provided with a pressure port for introducing the fluid pressure;
    a pressure detecting module attached to the fitting and shutting an end of the pressure port; and
    a volume adjusting member having a penetrating channel of a smaller cross section than the pressure port and disposed inside the pressure port of the fitting, the volume adjusting member positioned to protrude into openings of both the fitting and the pressure detecting module,
    wherein the pressure detecting module is abutted and welded to the fitting, and wherein the position of the volume adjusting member corresponds to a welded part of the fitting and the pressure detecting module.

2. The pressure sensor according to claim 1, wherein the volume adjusting member comprises a metal cylindrical member.

3. The pressure sensor according to claim 2, wherein the penetrating channel comprises a through-hole formed along a central axis of the cylindrical volume adjusting member, the through-hole having a smaller diameter than the pressure port.

4. The pressure sensor according to claim 1, wherein abutting portions of the fitting and the pressure detecting module each have opposing tapered surfaces, wherein the tapered surface of the pressure detecting module grows narrower in proportion to a distance from the center of the pressure port, and wherein the welding is conducted from a direction of a slanting angle of the tapered surfaces.

5. The pressure sensor according to claim 4, wherein the direction in which the welding is conducted is offset in a predetermined direction relative to a central axis of the fitting and the pressure detecting module so that a trace of the welded part forms an envelope ranging sequentially with each other.

6. The pressure sensor according to claim 1, wherein a direction in which the welding is conducted is offset in a predetermined direction relative to a central axis of the fitting and the pressure detecting module so that a trace of the welded part forms an envelope.

7. The pressure sensor according to claim 1, wherein the pressure detecting module includes a cylindrical portion on a side connected to the fitting defining the opening for receiving the volume adjusting member.

8. The pressure sensor according to claim 1, wherein the volume adjusting member is a cylindrical pipe obtained by drawing processing.

9. A pressure sensor for detecting a fluid pressure, comprising:
    a fitting including a pressure port located at a central axis thereof for introducing the fluid pressure, the pressure port having a first fluid pressure intake end, a central portion and a second end, the second end including a fitted portion having a diameter greater than the diameter at the central portion of the pressure port;
    a pressure detecting module having a mounting end secured to the fitting and shutting the second end of the pressure port, the pressure detecting module including a diaphragm and a strain gauge at a sensing end for sensing the fluid pressure; and
    a volume adjusting member disposed in the fitted portion at the second end of the pressure port of the fitting and having a through hole of a smaller cross section than a cross section of the pressure port at the first intake end of the fitting.

10. The pressure sensor of claim 9, wherein an edge at the second end of the fitting includes a tapered fitting surface and an edge at the mounting end of the pressure detecting module include a corresponding tapered module surface, the tapered fitting surface and the tapered module surface being joined by welding.

11. The pressure sensor of claim 10, wherein the tapered fitting surface is slanted relative to a radial direction of the pressure port at an angle between 30 degrees and 60 degrees.

12. The pressure sensor of claim 9, wherein an inner side of the fitting and an inner side of the pressure detecting module are positioned adjacent an outer side of the volume adjusting member, so that a melted portion of metal from the welding reaches and contacts the volume adjusting member.

13. The apparatus of claim 9, wherein the volume adjusting member comprises a metal cylindrical member.

14. A method of making a fluid pressure sensor, the fluid pressure sensor comprising (1) a metal fitting including a pressure port located at a central axis thereof for introducing the fluid pressure, the pressure port having a first fluid pressure intake end, a central portion and a second end, the second end including a fitted portion having a diameter greater than the diameter at the central portion of the pressure port; (2) a pressure detecting module including a first end and a cavity extending from the first end toward a second sensing end, the first end of the pressure detecting module being mounted to the second end of the fitting, the pressure detecting module comprising a diaphragm and a strain gauge on the sensing end for sensing the fluid pressure; and (3) a volume adjusting member including a through hole of a smaller cross section than the cross section at the first intake end of the pressure port, the method comprising the steps of:

disposing the volume adjusting member in the fitted portion of the fitting and in the cavity of the pressure detecting module; and securing a module surface at the first end of the pressure detecting module to a fitting surface at the second end of the fitting to close the second end of the pressure port, thereby enclosing the volume adjusting member.

15. The method of claim 14, wherein the step of securing the module surface of the pressure detecting module to the fitting surface of the fitting comprises beam welding to join the surfaces.

16. The method of claim 15, wherein the beam welding step comprises aligning a welding beam device at an angle defined by the module surface and the fitting surface to join the surfaces and so that a melted portion flows along the surfaces and contacts the volume adjusting member enclosed therein.

17. The method of claim 16, wherein the welding beam device is offset by about 30 degrees.

18. The method of claim 15, wherein the beam welding step comprises aligning a welding beam device at an angle defined by the module surface of the fitting and the fitting surface, but offset from a central axis of the fitting, to join the surfaces.

19. The method of claim 15, wherein the module surface of the pressure detecting module and the fitting surface of the fitting are tapered at angles enabling surface-to-surface contact therebetween.

20. The method of claim 15, wherein the beam welding is conducted in a radial direction of the pressure port.

* * * * *